Aug. 14, 1923.
U. REIDT
VALVE
Filed May 11, 1921
1,465,147
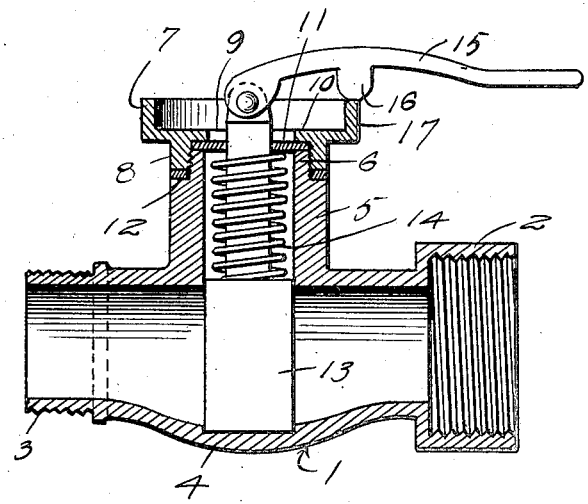
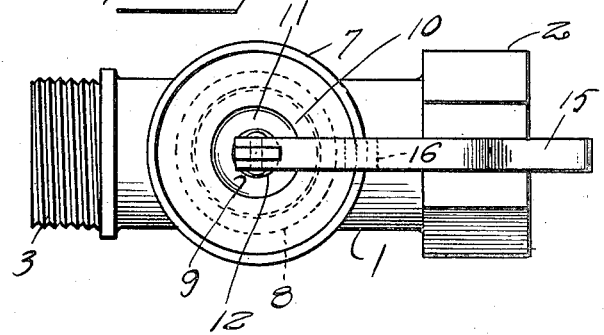
Inventor
U. Reidt Patented Aug. 14, 1923.

1,465,147

UNITED STATES PATENT OFFICE.

ULRICH REIDT, OF LOS ANGELES, CALIFORNIA.

VALVE.

Original application filed April 24, 1920, Serial No. 376,347. Divided and this application filed May 11, 1921. Serial No. 468,791.

*To all whom it may concern:*

Be it known that I, ULRICH REIDT, a citizen of Switzerland, residing at Los Angeles, in the county of Los Angeles and State of California, have invented certain new and useful Improvements in Valves; and I do hereby declare the following to be a full, clear, and exact description of the invention, such as will enable others skilled in the art to which it appertains to make and use the same.

This invention relates to new and useful improvements in valves, being a division of my application filed April 24, 1920, and serially numbered 376,347 and has for its primary object the provision of means for conveniently actuating a sliding gate, so that the water may be controlled as desired through the body of the valve.

Another object of this invention is the provision of a valve of the above stated character, which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view illustrating a valve constructed in accordance with my invention, Figure 2 is a top plan view illustrating the same.

Referring in detail to the drawings, the numeral 1 indicates an elongated hollow body which has formed integrally with one end an internally screw threaded female coupling element 2 adapted to be threaded to the usual male coupling element on the end of a hose. The other end of the body 1 is reduced and screw threaded as illustrated at 3 to provide a male coupling element adapted to be threaded into the female coupling element of a spray nozzle. The bottom wall of the body is slightly offset as illustrated at 4 and the top wall of said body directly in alinement with the offset 4 has formed integrally therewith a neck 5 which has communication with the interior of the body and has its upper end reduced and screw threaded as shown at 6.

A closure element 7 is provided with an internally screw threaded neck 8 adapted to have threaded connection with the reduced screw threaded end 6 of the neck 5 and the closure member is provided with an opening 9 of a diameter equal to the internal diameter of the neck 5 consequently providing a flange 10 that seats on the upper end of the reduced screw threaded end 6 of the neck 5. The flange 10 is adapted to clamp between itself and the end of the neck 5 a diaphragm plate 11 which is also provided with an opening to slidably receive a stem 12. The stem 12 is formed integrally with a gate 13 adapted for reciprocation within the neck 5 of the body 1 and when in its lowermost position adapted to close the passage through said body. A coil spring 14 is mounted on the stem and interposed between the diaphragm plate 11 and the gate 13 for the purpose of normally urging the latter into engagement with the offset 4 formed in the bottom wall of the body. The upper end of the stem 12 is reduced to form an attaching ear to which one end of a lever 15 is pivoted. The lever 15 has formed thereon a fulcrum lug 16 adapted to fulcrum or pivot on an upstanding flange 17 formed on the closure member 7 so that upon pressing downwardly on the free end of the lever, the gate 13 will be raised upwardly into the neck 5 permitting free passage of water or other liquid fluid through the body. As soon as pressure is released on the lever, the spring 14 returns the gate to a closed position.

While I have shown and described the preferred embodiment of my invention, it will be understood that minor changes in construction, combination, and arrangement of parts may be made without departing from the spirit and scope of the invention as claimed.

Having thus described my invention what I claim is:—

A valve comprising a body having a longitudinal opening therethrough, said body having a depression at its inner lower side, a neck formed on the upper side of said body and in alignment with the depression, a gate slidably mounted in said body and neck and adapted to seat in said depression, a closure for said neck having an inner annular horizontally extending flange and a vertically extending annular flange, a diaphragm resting on the upper end of said neck and secured in place by said horizontal flange, a stem on said gate and passing upward through an opening in said diaphragm, a spring surrounding said stem and bearing at its ends against the diaphragm and gate and normally holding said gate in closed position, and a handle pivoted to the outer end of the stem and having a lug bearing on the vertical flange and forming a fulcrum.

In testimony whereof I affix my signature in presence of two witnesses.

ULRICH REIDT.

Witnesses:
 WM. S. CAUDLE.
 E. B. LOSSNITZER.